United States Patent
Chen et al.

(10) Patent No.: US 12,325,438 B2
(45) Date of Patent: Jun. 10, 2025

(54) VEHICLE CONTROL METHOD, APPARATUS AND SYSTEM

(71) Applicant: GREAT WALL MOTOR COMPANY LIMITED, Baoding (CN)

(72) Inventors: Lin Chen, Baoding (CN); Stanislav Lincer, Baoding (CN); Jiaomin Sun, Baoding (CN)

(73) Assignee: GREAT WALL MOTOR COMPANY LIMITED, Baoding (CN)

(*) Notice: Subject to any disclaimer, the term of this patent is extended or adjusted under 35 U.S.C. 154(b) by 436 days.

(21) Appl. No.: 17/758,204

(22) PCT Filed: Apr. 26, 2021

(86) PCT No.: PCT/CN2021/089847
§ 371 (c)(1),
(2) Date: Jun. 29, 2022

(87) PCT Pub. No.: WO2021/218900
PCT Pub. Date: Nov. 4, 2021

(65) Prior Publication Data
US 2023/0039339 A1    Feb. 9, 2023

(30) Foreign Application Priority Data

Apr. 30, 2020 (CN) .......................... 202010366741.7

(51) Int. Cl.
*B60W 50/10* (2012.01)
*G06F 3/01* (2006.01)
*G05D 1/00* (2006.01)

(52) U.S. Cl.
CPC ............. *B60W 50/10* (2013.01); *G06F 3/017* (2013.01); *G05D 1/0016* (2013.01)

(58) Field of Classification Search
CPC ....... G06F 3/017; G06F 3/0488; B60K 35/10; B60K 2360/146; G05D 1/0016; G05D 1/2285
See application file for complete search history.

(56) References Cited

U.S. PATENT DOCUMENTS 10,180,729 B2 * 1/2019 Park ..................... B60K 35/60
2009/0278915 A1 11/2009 Kramer et al.
(Continued)

FOREIGN PATENT DOCUMENTS

| CN | 101349944 | 1/2009 |
| CN | 105807904 | 7/2016 |

(Continued)

OTHER PUBLICATIONS

CNIPA, First Office Action for CN Application No. 202010366741.7, May 17, 2022.
(Continued)

*Primary Examiner* — Steven B Theriault
(74) *Attorney, Agent, or Firm* — Hodgson Russ LLP (57) ABSTRACT

The present disclosure provides a vehicle control method, an apparatus and a system, applied to a terminal control device in a vehicle. The terminal control device is in communication connection to a human-machine interface device, and the vehicle comprises a plurality of executive mechanisms. The method comprises: when a start instruction for a target function is monitored, receiving current gesture data sent by the human-machine interface device; and when the current gesture data meets a preset condition, generating a target control instruction according to the current gesture data, and sending the target control instruction to a target executive mechanism for the target executive mechanism to execute an operation corresponding to the current gesture data.

18 Claims, 3 Drawing Sheets

(56) References Cited

U.S. PATENT DOCUMENTS

| | | | | |
|---|---|---|---|---|
| 2010/0185341 | A1* | 7/2010 | Wilson | B60R 25/2045 701/1 |
| 2012/0262403 | A1* | 10/2012 | Tissot | B60K 35/00 345/173 |
| 2013/0144462 | A1* | 6/2013 | Ricci | G06F 3/0488 701/1 |
| 2014/0152551 | A1* | 6/2014 | Mueller | B60K 35/00 345/156 |
| 2014/0223384 | A1* | 8/2014 | Graumann | B60K 35/10 715/863 |
| 2014/0270382 | A1* | 9/2014 | Cheng | G06F 3/017 382/104 |
| 2014/0309871 | A1* | 10/2014 | Ricci | G06F 16/583 701/36 |
| 2014/0309879 | A1* | 10/2014 | Ricci | G08G 1/096725 701/36 |
| 2015/0261318 | A1 | 9/2015 | Scavezze et al. | |
| 2015/0367816 | A1* | 12/2015 | Schindler | B60R 25/2045 356/5.01 |
| 2016/0098088 | A1 | 4/2016 | Park | |
| 2016/0129832 | A1* | 5/2016 | Zakhem | B60K 35/60 315/77 |
| 2016/0170494 | A1* | 6/2016 | Bonnet | B60K 35/60 345/173 |
| 2016/0200195 | A1* | 7/2016 | Jun | B60K 35/10 715/765 |
| 2016/0266655 | A1* | 9/2016 | Heyl | B60K 35/10 |
| 2016/0306532 | A1* | 10/2016 | Ko | B60H 1/00985 |
| 2016/0342406 | A1* | 11/2016 | Ahmed | G06F 8/61 |
| 2017/0120932 | A1* | 5/2017 | Szczerba | B60K 35/26 |
| 2017/0177207 | A1* | 6/2017 | Ahmed | G06F 1/3206 |
| 2017/0242491 | A1* | 8/2017 | Wild | G06F 3/017 |
| 2017/0269698 | A1* | 9/2017 | Wakuda | G06F 3/017 |
| 2017/0320501 | A1* | 11/2017 | Li | B60K 35/10 |
| 2018/0136802 | A1* | 5/2018 | Soni | H04L 51/42 |
| 2018/0203517 | A1* | 7/2018 | Hollmig | G03H 1/2249 |
| 2019/0144000 | A1 | 5/2019 | Hennes et al. | |
| 2019/0263439 | A1* | 8/2019 | Pramsoler | G06F 3/0482 |
| 2019/0302895 | A1* | 10/2019 | Jiang | G06F 3/016 |
| 2019/0324527 | A1* | 10/2019 | Present | G06V 10/82 |
| 2019/0392107 | A1* | 12/2019 | Ricci | G06F 21/44 |
| 2020/0026421 | A1* | 1/2020 | Rosa | G06F 3/0412 |
| 2020/0150858 | A1* | 5/2020 | Luna Garcia | G06F 3/0488 |
| 2020/0201442 | A1* | 6/2020 | Chikuri | G06F 3/16 |
| 2021/0072831 | A1* | 3/2021 | Edwards | G06V 40/10 |
| 2021/0179139 | A1* | 6/2021 | Park | B60K 35/28 |
| 2021/0253120 | A1* | 8/2021 | Ahire | B60W 50/08 |
| 2021/0256316 | A1* | 8/2021 | Ahire | H04L 9/50 |
| 2021/0380138 | A1* | 12/2021 | Kucharski | G08B 21/02 |
| 2021/0380139 | A1* | 12/2021 | Taveira | G06F 3/017 |

FOREIGN PATENT DOCUMENTS

| | | |
|---|---|---|
| CN | 106354259 | 1/2017 |
| CN | 106843729 | 6/2017 |
| CN | 107102731 | 8/2017 |
| CN | 107640159 | 1/2018 |
| CN | 109552340 | 4/2019 |
| CN | 110435561 | 11/2019 |
| CN | 110764616 | 2/2020 |
| CN | 111645701 | 9/2020 |
| DE | 102018208889 | 12/2019 |
| EP | 2441635 | 4/2012 |
| WO | 2019033957 | 2/2019 |

OTHER PUBLICATIONS

WIPO, International Search Report for PCT/CN2021/089847, Jul. 29, 2021.

EPO, Extended European Search Report for EP Application No. 21797619.0, Jul. 14, 2023.

* cited by examiner

VEHICLE CONTROL METHOD, APPARATUS AND SYSTEM

CROSS-REFERENCE TO RELATED APPLICATIONS

The present application is a U.S. national stage entry of International Application No. PCT/CN2021/089847, filed Apr. 26, 2021, which claims priority to Chinese patent application No. 202010366741.7, filed Apr. 30, 2020, the entire disclosures of which are incorporated herein by reference.

TECHNICAL FIELD

The present disclosure relates to the technical field of vehicles, and more particularly, to a vehicle control method, an apparatus and a system.

BACKGROUND

At present, gesture-controlled vehicles have become new research hotspots. In the prior art of using gestures to control vehicles, a gesture of a driver is directly processed by a Human Machine Interface (HMI) device, an intention of the driver is recognized by the HMI device, and the intention is directly transmitted to a target device, so that the target device performs a corresponding operation.

However, in the above manner, once the HMI module recognizing the driving intention fails or a path of transferring the driving intention fails, it is easy to cause that data received by terminal receiving device cannot represent the real driving intention, and even results in false triggering of functions to cause a driving danger. For example, full-automatic parking is mistakenly activated, resulting in a high-speed non-expected lateral movement, causing fatal car crash.

In the prior art, in order to correctly recognize and transfer the driving intention, it is necessary to increase protective measures for the HMI device and module in the path of transferring, and the related devices need to be developed in accordance with corresponding ASIL levels. However, the above approach not only increases the cost significantly, but also makes the system too complex to meet the corresponding ASIL level requirements.

SUMMARY

In light of this, the present disclosure aims to provide a vehicle control method, apparatus and system to solve a problem that existing manner of controlling a vehicle using gestures cannot effectively avoid dangers due to incorrect gesture recognition and incorrect data transmission.

In order to achieve the above objects, the technical solutions of the present disclosure are implemented as follows:

A vehicle control method applied to a terminal control device in a vehicle, wherein the terminal control device is in communication connection to a human-machine interface device, the vehicle includes a plurality of executive mechanisms, and the method includes:
when a start instruction for a target function is monitored, receiving current gesture data sent by the human-machine interface device; and
when the current gesture data meets a preset condition, generating a target control instruction according to the current gesture data, and sending the target control instruction to a target executive mechanism for the target executive mechanism to execute an operation corresponding to the current gesture data.

Further, in the vehicle control method, a recommended gesture corresponding to each sub-function is stored in the vehicle; and the step of, when the start instruction for the target function is monitored, receiving the current gesture data sent by the human-machine interface device, includes:
when the start instruction for the target function is monitored, sending the recommended gesture corresponding to each sub-function in the target function to the human-machine interface device for the human-machine interface device to display; and
receiving the current gesture data sent by the human-machine interface device.

Further, in the vehicle control method, a recommended gesture corresponding to each sub-function is stored in the vehicle; and the current gesture data includes a gesture parameter; and
the step of, when the current gesture data meets the preset condition, generating the target control instruction according to the current gesture data, and sending the target control instruction to the target executive mechanism, includes:
reconstructing an actual gesture according to the current gesture data;
acquiring the recommended gesture corresponding to each sub-function in the target function; and
if a difference value between the actual gesture and the recommended gesture is within a first preset range, generating the target control instruction according to the recommended gesture, and sending the target control instruction to the target executive mechanism.

Further, in the vehicle control method, the current gesture data further includes a preliminary gesture, and the preliminary gesture is a gesture determined by the human-machine interface device based on the acquired gesture operation; and
the step of, acquiring the recommended gesture corresponding to each sub-function in the target function, includes:
if a difference value between the preliminary gesture and the actual gesture is within a second preset range, acquiring the recommended gesture corresponding to each sub-function in the target function.

Further, in the vehicle control method, a recommended gesture corresponding to each sub-function is stored in the vehicle; and when the recommended gesture corresponding to the target function is a periodic gesture, the step of, when the current gesture data meets the preset condition, generating the target control instruction according to the current gesture data, and sending the target control instruction to the target executive mechanism, includes:
determining expected gesture data according to the gesture data acquired last time and the recommended gesture corresponding to the target function; and
if a difference value between the current gesture data and the expected gesture data is within a third preset range, generating the target control instruction according to the current gesture data, and sending the target control instruction to the target executive mechanism.

Further, in the vehicle control method, historical usage of each function is stored in the vehicle; and before the step of, when the start instruction for the target function is monitored, receiving the current gesture data sent by the human-machine interface device, the method further includes:
when receiving wake-up gesture data sent by the human-machine interface device, determining a recommended function according to the wake-up gesture data, and sending recommended information of the recommended function to the human-machine interface device for the human-machine interface device to display; and when a confirmation operation for the recommended information is monitored, determining that the recommended function is the target function, and generating the start instruction for the target function.

Further, a start gesture corresponding to each function is stored in the vehicle, and the recommended information includes a target start gesture for the recommended function; and the step of, when the confirmation operation for the recommended information is monitored, determining that the recommended function is the target function, and generating the start instruction for the target function, includes:

when monitoring that a difference value between the actual gesture operation for the recommended information and the target start gesture is within a fourth preset range, determining that the recommended function is the target function, and generating the start instruction for the target function.

Further, the current gesture data includes a gesture position, a moving speed, a moving direction or a moving shape, wherein:

the moving shape includes a curved surface diameter and a curved surface center.

Another object of the embodiments of the present disclosure is to provide a vehicle control apparatus applied to a terminal control device in a vehicle, wherein the terminal control device is in communication connection to a human-machine interface device, the vehicle includes a plurality of executive mechanisms, and the apparatus includes:

a receiving module configured for, when a start instruction for a target function is monitored, receiving current gesture data sent by the human-machine interface device; and an instruction module configured for, when the current gesture data meets a preset condition, generating a target control instruction according to the current gesture data, and sending the target control instruction to a target executive mechanism for the target executive mechanism to execute an operation corresponding to the current gesture data.

Compared with the prior art, the vehicle control method and apparatus according to the present disclosure have the following advantages:

When performing the gesture operation, the terminal control device in the vehicle recognizes and judges the gesture data generated by the gesture operation, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

The embodiments of the present disclosure further provide another vehicle control method applied to a human-machine interface device, wherein the human-machine interface device is in communication connection to a terminal control device in a vehicle, the vehicle includes a plurality of executive mechanisms, and the method includes:

when a start instruction for a target function is monitored, monitoring a gesture operation;

generating current gesture data according to the gesture operation; and sending the current gesture data to the terminal control device for the terminal control device to generate a target control instruction according to the current gesture data when the current gesture data meets a preset condition, and send the target control instruction to a target executive mechanism for the target executive mechanism to execute a operation corresponding to the current gesture data.

Further, in the vehicle control method, the step of, generating the current gesture data according to the gesture operation, includes:

determining a gesture parameter according to the gesture operation;

determining a preliminary gesture according to the gesture parameter; and generating the current gesture data from the gesture parameter and the preliminary gesture.

Another object of the embodiments of the present disclosure is to provide another vehicle control apparatus applied to a human-machine interface device, wherein the human-machine interface device is in communication connection to a terminal control device in a vehicle, the vehicle includes a plurality of executive mechanisms, and the apparatus includes:

a monitoring module configured for, when a start instruction for a target function is monitored, monitoring a gesture operation;

a data generating module configured for generating current gesture data according to the gesture operation; and a sending module configured for sending the current gesture data to the terminal control device for the terminal control device to generate a target control instruction according to the current gesture data when the current gesture data meets a preset condition, and send the target control instruction to a target executive mechanism for the target executive mechanism to execute an operation corresponding to the current gesture data.

The embodiments of the present disclosure further provide a vehicle control system including a human-machine interface device and a terminal control device of a vehicle, wherein:

when a start instruction for a target function is monitored, the human-machine interface device monitors a gesture operation;

the human-machine interface device generates current gesture data according to the gesture operation;

the human-machine interface device sends the current gesture data to the terminal control device;

the terminal control device receives the current gesture data sent by the human-machine interface device; and when the current gesture data meets a preset condition, the terminal control device generates a target control instruction according to the current gesture data, and sends the target control instruction to a target executive mechanism for the target executive mechanism to execute an operation corresponding to the current gesture data.

Yet another object of the present disclosure is to provide a vehicle including the vehicle control system as described above.

Compared with the prior art, the vehicle control method, apparatus and system according to the present disclosure have the following advantages:

When performing the gesture operation, the gesture data corresponding to the gesture operation is sent to the terminal control device of the vehicle first, then the terminal control device in the vehicle recognizes and judges the gesture data, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

The present disclosure further provides a computing-processing device, including:
- a memory in which a computer-readable code is stored; and
- one or more processors, wherein when the computer-readable code is executed by the one or more processors, the computing-processing device executes any of the above vehicle control methods.

The present disclosure further discloses a computer program, including a computer-readable code, wherein the computer-readable code, when being executed on a computing-processing device, causes the computing-processing device to execute any of the above vehicle control methods.

The present disclosure further provides a computer-readable medium, wherein the computer-readable medium stores the above computer program.

The above description is merely a summary of the technical solutions of the present disclosure. In order to more clearly know the technical means of the present disclosure to enable the implementation according to the contents of the description, and in order to make the above and other objects, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the drawings that are required to describe the embodiments or the related art will be briefly introduced below. Apparently, the drawings that are described below are embodiments of the present disclosure, and a person skilled in the art can obtain other drawings according to these drawings without paying creative work.

Drawings constituting a part of the present disclosure here serve to provide a further understanding of the present disclosure, and the illustrative embodiments of the present disclosure and together with the description thereof serve to explain the present disclosure, and do not constitute inappropriate restriction to the present disclosure. In the drawings.

DETAILED DESCRIPTION OF THE EMBODIMENTS

The embodiments of the present disclosure will be described in further detail hereinafter with reference to the drawings. Although the embodiments of the present disclosure are shown in the drawings, it should be understood that the present disclosure may be embodied in various forms and should not be construed as limited to the embodiments set forth herein. On the contrary, these embodiments are provided so that the present disclosure will be understood more thoroughly, and the scope of the present disclosure can be perfectly conveyed to those skilled in the art.

It should be noted that, in case of no conflict, the embodiments in the present disclosure and the features in the embodiments may be combined with each other.

The present disclosure will be explained in detail with reference to the drawings and embodiments hereinafter.

Figure 1:
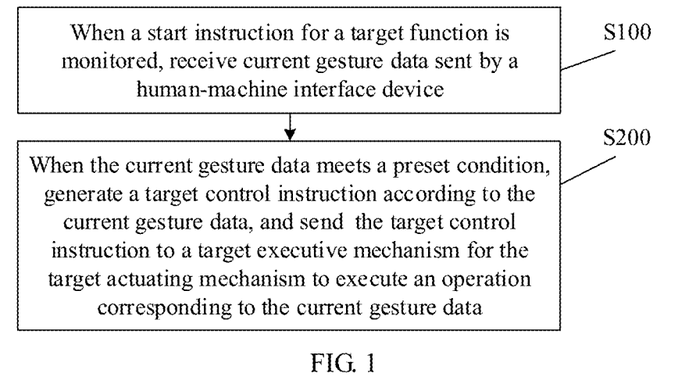
FIG. 1 is a flow chart of a vehicle control method provided by an embodiment of the present disclosure.

Please refer to FIG. 1, which illustrates a flow chart of a vehicle control method provided by an embodiment of the present disclosure. The vehicle control method provided by an embodiment of the present disclosure is applied to a terminal control device in a vehicle. The terminal control device is in communication connection to a human-machine interface device, and the vehicle includes a plurality of executive mechanisms. The method includes steps S100-S200.

In the vehicle control method provided by an embodiment of the present disclosure, the terminal control device may be a vehicle controller or a specific function module, and the like. The human-machine interface device may be a vehicle-mounted device such as a central control of the vehicle and a vehicle-mounted camera and so on, which is in communication connection to the terminal control device through a Controller Area Network (CAN) of the terminal control device directly. The above man-machine interface device may also be a mobile device such as a mobile phone and a tablet computer and so on, that can monitor gesture operations. The human-machine interface device communicates with a vehicle-mounted communication terminal through a wireless network, and the terminal control device communicates with the vehicle-mounted communication terminal through the CAN network, thus realizing the communication connection between the terminal control device and the human-machine interface device.

The target function refers to a specific vehicle function that a driver intends to achieve through gesture operation, such as a vehicle-mounted remote parking function, and the like. The above executive mechanisms refer to specific vehicle mechanisms used to realize different vehicle functions, and the driving intention expressed by the gesture operation of the driver can be realized through the independent work of the above executive mechanisms or the cooperative work of the plurality of executive mechanisms. During actual application, the above executive mechanisms include a steering system, a braking system, a power assembly, a transmission, a four-wheel drive control system, or the like.

Step S100: when a start instruction for a target function is monitored, receiving current gesture data sent by the human-machine interface device.

In the above step S100, the vehicle has a variety of functions that may be specifically executed by gesture operations, but the premise is that these functions have to be started first, and then the corresponding functions can be executed according to the gesture operation of the driver. When the start instruction for the target function is monitored, it means that the driver needs to start the target function. However, how to specifically execute the target function needs to be carried out according to the specific gesture operation of the driver, so it is necessary to receive the current gesture data sent by the human-machine interface device, which reflects the current specific gesture operation of the driver.

During actual application, the current gesture data may include gesture parameters such as a gesture position, a moving speed, a moving direction, a moving shape, and the like. The moving shape may include a curved surface diameter and a curved surface center, or the like.

Step S200: when the current gesture data meets a preset condition, generating a target control instruction according to the current gesture data, and sending the target control instruction to a target executive mechanism for the target executive mechanism to execute an operation corresponding to the current gesture data.

In the above step S200, the preset condition refers to a condition that is preset and used to determine whether the current gesture data is reasonable or dangerous to the vehicle, and also refers to a condition that determines whether the current gesture data truly reflects the driving intention of the driver. The above target control instruction refers to an instruction that controls the specific executive mechanism to execute the corresponding operation, while the target executive mechanism refers to a specific mechanism that realizes the target function.

When the current gesture data meets the preset condition, it means that the currently acquired gesture data is in a reasonable state and will not cause dangers to the vehicle, and is determined to truthfully reflect the driving intention of the driver. Therefore, the target control instruction is generated according to the current gesture data, and the target control instruction is sent to the target executive mechanism for the target executive mechanism to execute the operation corresponding to the current gesture data, thus realizing the target function.

When the current gesture data does not meet the preset condition, it means that the currently acquired gesture data is in a state which is unreasonable and will cause dangers to the vehicle, and is determined to not truthfully reflect the driving intention of the driver. Therefore, the step of generating the target control instruction according to the current gesture data is not executed, and gesture data transmission is controlled to be interrupted to enter a safe state or take appropriate actions, so as to avoid outputting abnormal function actions and violating safety.

In the step S200 above, the analysis process of judging whether the acquired current gesture data meets the preset condition, and when the current gesture data meets the preset condition, the operation of generating the target control instruction according to the current gesture data and sending the target control instruction to the target executive mechanism are all directly executed by the terminal control device instead of a gesture acquisition device. In this way, when the gesture data or the instruction corresponding to the gesture is damaged in the process of being transmitted from the human-machine interface device to the terminal control device, the terminal control device cannot recognize the expected gesture and driving intention according to the received data, and the terminal control device cannot generate the corresponding target control instruction, thus not causing the wrong output of gesture-based functions and behaviors, and ensuring the safety. Meanwhile, the above manner only needs the terminal control device to be developed according to the corresponding vehicle safety integrity levels, while HMI devices and transmission path devices do not need any additional design for the vehicle safety integrity levels, thus saving the development and design costs.

Compared with the prior art, the vehicle control method according to the present disclosure has the following advantages:

When performing the gesture operation, the gesture data corresponding to the gesture operation is sent to the terminal control device of the vehicle first, then the terminal control device in the vehicle recognizes and judges the gesture data generated by the gesture operation, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

In a practical application scenario, the target function may be a remote parking function, a remote window lifting function, a remote door unlocking function, a remote back door opening and closing function, a remote engine control function, a remote heating control function, and the like. For example, the target function is the remote parking function. In this application scenario, the driver starts the remote parking function by a certain gesture operation through the prompt of a mobile APP interface, and controls the start and stop of the parking process by interacting with the mobile APP through a specific gesture operation. During the remote parking process, the mobile APP acquires a gesture operation of the driver and recognizes the intention of the driver, such as the start, pause, termination and start of remote parking. Then, the gesture operation of the driver is converted into the gesture data and sent to the vehicle-mounted communication terminal. After receiving the gesture data sent by the mobile phone, the vehicle-mounted communication terminal transmits the data to a remote parking control module. Based on the gesture data and a current state of the vehicle, the remote parking control module may generate a corresponding parking instruction to control the vehicle to park automatically when it is determined that the gesture data meets the preset conditions. However, when it is determined that the gesture data does not meet the preset condition, the corresponding parking instruction may not be generated and the remote parking control module enters a safe state.

Optionally, in an implementation, before the above step S100, the vehicle control method provided by an embodiment of the present disclosure further includes steps S1001-S1002.

S1001: when receiving wake-up gesture data sent by the human-machine interface device, determining a recommended function according to the wake-up gesture data, and sending recommended information of the recommended function to the human-machine interface device for the human-machine interface device to display.

In the above step S1001, as the sub-functions of each function have the corresponding recommended gestures, and the recommended gestures corresponding to the sub-functions of different functions may be similar or even the same, when the driver executes a wake-up gesture operation and sends the wake-up gesture data through the human-machine interface device, the recommended function corresponding to the wake-up gesture data may be determined based on the wake-up gesture data, and the recommended function includes at least one sub-function with the recommended gesture the same or similar to the gesture corresponding to the wake-up gesture data. Sending the recommended function to the human-machine interface device for the human-machine interface device to display may enable the driver to specifically choose whether to execute the above recommended function.

Optionally, during actual application, historical usage of each function is stored in the vehicle, and when determining the above recommended function, the recommended function may be determined based on the wake-up gesture data and the historical usage, that is, a function that the driver most likely needs to use is used as the recommended function for the driver to choose and use.

During actual application, the recommended function may be one or more.

S1002: when a confirmation operation for the recommended information is monitored, determining that the recommended function is the target function, and generating the start instruction for the target function.

In the above step S1002, the confirmation operation above is an operation of confirming the use of the recommended function by voice, gesture, touch and pressing etc. issued by the human-machine interface device. If the confirmation operation for the recommended function is monitored, it means that the driver confirms that the above recommended function needs to be used. Therefore, the recommended function is taken as the target function, and the start instruction for the target function is generated, so that the specific executive mechanisms can be controlled to execute the corresponding work according to a subsequent gesture operation of the driver, thereby realizing the target function.

Optionally, in an implementation, a start gesture corresponding to each function is also stored in the vehicle. The recommended information includes a target start gesture and a function description for the recommended function. The above step S1002 specifically includes: when monitoring that a difference value between the actual gesture operation for the recommended information and the target start gesture is within a fourth preset range, determining that the recommended function is the target function, and generating the start instruction for the target function.

In this embodiment, the fourth preset range is a preset threshold for judging whether the actual gesture operation monitored by the human-machine interface device matches the start gesture. When the difference between the actual gesture operation for the recommended information and the target start gesture is within the fourth preset range, it means that the driver wants to start the recommended function, so the recommended function is determined as the target function, and the start instruction for the target function is generated.

Optionally, in an implementation, in the vehicle control method provided by an embodiment of the present disclosure, a recommended gesture corresponding to each sub-function is stored in the vehicle; and the above step S100 specifically includes steps S101-S102.

In this embodiment, the recommended gesture corresponding to each sub-function is a standard operation gesture to specifically realize each function, and when the driver executes a gesture operation according to the recommended gesture, the vehicle may be triggered to realize the corresponding function. During actual application, the above recommended gesture may include a gesture shape and a corresponding moving track, and according to the recommended gesture, the driver can intuitively know the specific gesture operation to control the vehicle to execute the target function.

Step S101: when the start instruction for the target function is monitored, sending the recommended gesture corresponding to each sub-function in the target function to the human-machine interface device for the human-machine interface device to display.

In the above step S101, when the start instruction for the target function is monitored, that is, when the driver needs to start the target function, the recommended gesture corresponding to the target function is sent to the human-machine interface device first, and then the human-machine interface device displays the gesture, so as to better prompt the driver how to execute the gesture operation to control the vehicle to realize the target function.

Step S102: receiving the current gesture data sent by the human-machine interface device.

In the above step S102, after the recommended gesture corresponding to each sub-function in the target function is sent to the human-machine interface device, the gesture data representing the specific gesture operation of the driver acquired and sent by the human-machine interface device is received, so as to determine and generate the corresponding instruction to control the specific executive mechanisms to realize the corresponding target function according to the gesture data.

In this embodiment, the recommended gesture corresponding to each sub-function in the target function is sent to the human-machine interface device first, and then the human-machine interface device displays the gesture, so as to better prompt the driver how to execute the gesture operation, and control the vehicle to realize each sub-function in the target function.

Optionally, in an implementation, a recommended gesture corresponding to each sub-function is stored in the vehicle; and when the recommended gesture corresponding to each sub-function in the target function is a periodic gesture, the above step S200 includes steps S201-S202.

In this embodiment, the recommended gesture corresponding to each sub-function is a standard operation gesture to specifically realize each function, and when the driver executes a gesture operation according to the recommended gesture, the vehicle may be triggered to realize the corresponding function. When the recommended gesture corresponding to the target function is a periodic gesture, it means that the driver needs to periodically execute the gesture operation to control the vehicle to continuously execute the target function.

Step S201: determining expected gesture data according to the gesture data acquired last time and the recommended gesture corresponding to each sub-function in the target function.

In the above step S201, when the recommended gesture corresponding to each sub-function in the target function is a periodic gesture, the human-machine interface device may receive a periodic gesture operation executed by the driver and send gesture data generated by the periodic gesture operation to the terminal control device, so that the terminal control device can periodically acquire the gesture data corresponding to the target function. As the recommended gesture corresponding to each sub-function of the target function is stored in the vehicle, and as the vehicle can be controlled to execute the target function only by executing the gesture operation according to the recommended gestures, if the driver wants to normally realize the target function, the gesture data received at present and the recommended gestures may be combined to predict gesture data received next time. That is, expected gesture data that should be obtained from the human-machine interface device this time may also be determined according to the gesture data received last time and the recommended gesture.

Step S202: if a difference value between the current gesture data and the expected gesture data is within a third preset range, generating the target control instruction according to the current gesture data, and sending the target control instruction to the target executive mechanism.

In the above step S202, the third preset range is a preset threshold for determining whether the received current gesture data meets expectation, that is, a threshold for determining whether the received current gesture data truly represents the driving intention of the driver. When the difference value between the current gesture data and the expected gesture data is within the third preset range, the received current gesture data meets the expectation, and it is judged that the received current gesture data truly represents the driving intention of the driver, therefore, the target control instruction is generated according to the current gesture data and the target control instruction is sent to the target executive mechanism. However, when the difference between the current gesture data and the expected gesture data is not within the third preset range, it means that the received current gesture data does not meet the expectation, and it is judged that the received current gesture data does not truly represent the driving intention of the driver or the data is wrong, so that the target control instruction may not be generated according to the current gesture data, and the target control instruction may not be sent to the target executive mechanism either, so that the problem of dangers caused by the false function triggering of the vehicle caused by the wrong recognition of the driving intention of the driver is avoided.

During actual application, the third preset range above may be 3%-30%. In addition, in order to ensure the realization of the target function, gesture data transmission rates should be high enough and orderly. For the periodic gesture, the data transmission rate thereof is at least twice that of the gesture operation.

Optionally, in an implementation, a recommended gesture corresponding to each sub-function is stored in the vehicle; the gesture data includes a gesture parameter; and the above step S200 includes steps S211-S213.

In this embodiment, the recommended gesture corresponding to each sub-function is a standard operation gesture to specifically realize the sub-functions in each function, and when the driver executes a gesture operation according to the recommended gesture, the vehicle may be triggered to realize the corresponding sub-function.

Step S211: reconstructing an actual gesture according to the gesture data.

In the above step S211, the gesture parameter specifically includes a gesture position, a moving speed, a moving direction, a moving shape, and the like, so the actual gesture corresponding to the gesture operation executed by the driver may be reconstructed through the received gesture parameter.

Step S212: acquiring the recommended gesture corresponding to each sub-function in the target function.

In the above step S212, since the recommended gesture corresponding to each function is stored in the vehicle, when the start instruction for the target function is monitored, the target function can be determined, and then the recommended gesture can be determined.

Step S213: if a difference value between the actual gesture and the recommended gesture is within a first preset range, generating the target control instruction according to the recommended gesture, and sending the target control instruction to the target executive mechanism.

In the above step S213, the first preset range is a preset threshold for determining whether the actual gesture meets the recommended gesture, that is, a threshold for determining whether the received current gesture data truly represents the driving intention of the driver. When the difference value between the actual gesture and the recommended gesture corresponding to each sub-function in the target function is within the first preset range, it means that the actual gesture matches the recommended gesture, that is, the recommended gesture may be used as a target recommended gesture. It is judged that the received current gesture data truly represents the driving intention of the driver, therefore, the target control instruction is generated according to the current gesture data and the target control instruction is sent to the target executive mechanism. However, when the difference between the actual gesture and the recommended gesture is not within the first preset range, it means that the actual gesture does not match the recommended gesture, and it is judged that the received current gesture data does not truly represent the driving intention of the driver or the data is wrong, so that the target control instruction may not be generated according to the current gesture data, and the target control instruction may not be sent to the target executive mechanism either, so that the problem of dangers caused by the false function triggering of the vehicle caused by the wrong recognition of the driving intention of the driver is avoided.

Optionally, in a more specifical implementation, the gesture data further includes a preliminary gesture, the preliminary gesture is a gesture determined by the human-machine interface device based on the acquired gesture operation, and the step S212 specifically includes: if a difference value between the preliminary gesture and the actual gesture is within a second preset range, acquiring the recommended gesture corresponding to each sub-function in the target function.

In this embodiment, when monitoring the gesture operation of the driver, the human-machine interface device determines the corresponding gesture parameter based on the gesture operation first, and meanwhile, perform recognition according to the gesture parameter, so as to obtain the gesture obtained by the recognition and analysis of the human-machine interface device, and then packages the preliminary gesture and the gesture parameter into gesture data and sends the gesture data to the terminal control device of the vehicle. After receiving the gesture data, the terminal control device reconstructs the actual gesture based on the gesture parameter, and then compares the reconstructed actual gesture with the preliminary gesture sent from the human-machine interface device, so as to determine whether the gesture parameter is damaged during the transmission from the human-machine interface device to the terminal control device.

The second preset range is a preset threshold for determining whether the actual gesture matches the preliminary gesture, that is, a threshold for determining whether the received gesture parameter is damaged in the process of being transmitted from the human-machine interface device to the terminal control device. If the difference value between the preliminary gesture and the actual gesture is within the second preset range, it means that the actual gesture matches the preliminary gesture, that is, it is determined that the received gesture parameter is not damaged in the process of being transmitted from the human-machine interface device to the terminal control device, that is, the gesture parameter obtained by the terminal control device is the gesture parameter issued by the human-machine interface device, so that the following step of acquiring the recommended gesture corresponding to each sub-function in the target function is entered, so as to further determine whether the actual gesture corresponding to the gesture parameter is safe and reasonable and reflects the real driving intention of the driver.

In this embodiment, the human-machine interface device needs to execute the preliminary gesture recognition, and send the perceived gesture parameter and gesture recognition results to the terminal control device. Then, the terminal control device first recognizes the gesture expressed by the gesture parameter in the received data, and then compares the gesture with the preliminary gesture in the received data. If the two gestures are consistent, it is considered that there is no abnormality when the data passes through the human-machine interface device and the transmission system. Due to the respective recognition and final comparison of the human-machine interface device and the terminal control device, the reliability of recognition results in the above process is increased, which further ensures the safety of the system.

Figure 2:
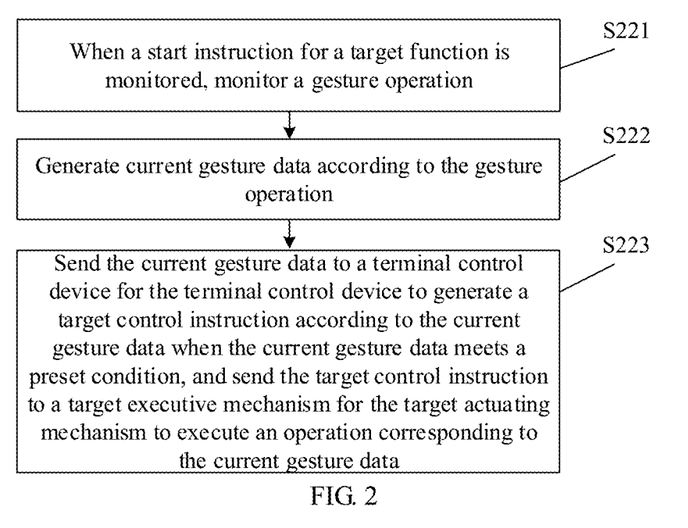
FIG. 2 is a flow chart of a vehicle control method provided by another embodiment of the present disclosure.

Please refer to FIG. 2, which illustrates a flow chart of another vehicle control method provided by an embodiment of the present disclosure. Another vehicle control method provided by an embodiment of the present disclosure is applied to a human-machine interface device, wherein the human-machine interface device is in communication connection to a terminal control device in a vehicle, the vehicle includes a plurality of executive mechanisms, and the method includes steps S221-S223.

Step S221: when a start instruction for a target function is monitored, monitoring a gesture operation.

In the above step S221, when a driver selects to start the target function, the start instruction is triggered at the side of the human-machine interface device, and the start instruction for the target function may also be sent to the terminal control device at the same time. Therefore, when the start instruction for the target function is monitored, it means that the driver may execute the gesture operation on the human-machine interface device when the driver needs to start the target function, so that the gesture operation can be monitored, and corresponding gesture data can be obtained in the subsequent step S222.

During actual application, the above step of monitoring the gesture operation may be specifically executed by a touch sensor in the human-machine interface device, so as to obtain a gesture parameter.

Step S222: generating current gesture data according to the gesture operation.

In the above step S222, the corresponding gesture data can be obtained by monitoring the gesture operation executed by the driver on the human-machine interface device.

Step S223: sending the current gesture data to the terminal control device for the terminal control device to generate a target control instruction according to the current gesture data when the current gesture data meets a preset condition, and send the target control instruction to a target executive mechanism for the target executive mechanism to execute an operation corresponding to the current gesture data.

In the above step S223, the gesture data corresponding to the gesture operation is sent to the terminal control device of the vehicle via a transmission system, then the terminal control device in the vehicle recognizes and judges the gesture data, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and data transmission.

In practical application, the above transmission system refers to a system that can establish communication connection between the human-machine interface device and the terminal control device, which may specifically include a server of Internet of Vehicles, a vehicle-mounted communication terminal, a CAN network, and the like.

Optionally, in an implementation, the above step S222 specifically includes steps S2221-S2223.

S2221: determining a gesture parameter according to the gesture operation.

In the above step S2221, by monitoring the gesture operation of the driver on the human-machine interface device, the corresponding gesture parameter may be determined, and a corresponding gesture shape may be determined by the above gesture parameter, that is, the gesture operation of the driver may be reproduced. Specifically, the gesture parameter includes gesture parameters such as a gesture position, a moving speed, a moving direction, a moving shape, and the like. The moving shape may include a curved surface diameter and a curved surface center, or the like.

S2222: determining a preliminary gesture according to the gesture parameter.

In the above step S2222, the human-machine interface device analyzes and recognizes the gesture reflected by the gesture parameter determined in the step S2221, that is, the above preliminary gesture is obtained.

S2223: generating the current gesture data from the gesture parameter and the preliminary gesture.

In the above step S2223, that is, the gesture parameter determined according to the gesture operation of the driver in step S2221 and the preliminary gesture determined in step S2222 are packaged as the current gesture data, and then sent to the terminal control device. When the current gesture data meets a preset condition, the terminal control device generates a target control instruction according to the current gesture data, and sends the target control instruction to a target executive mechanism for the target executive mechanism to execute an operation corresponding to the current gesture data.

Compared with the prior art, the vehicle control method according to the present disclosure has the following advantages:

When performing the gesture operation, the gesture data corresponding to the gesture operation is sent to the terminal control device of the vehicle first, then the terminal control device in the vehicle recognizes and judges the gesture data generated by the gesture operation, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

Figure 3:
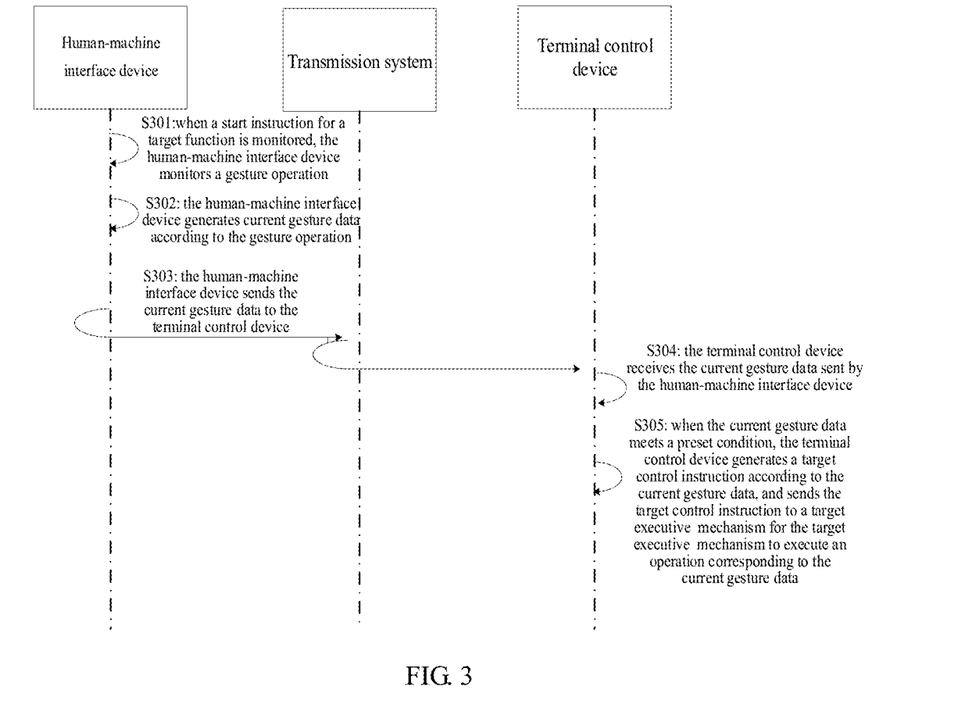
FIG. 3 is a flow chart of interactive steps of a vehicle control method provided by an embodiment of the present disclosure.

Please refer to FIG. 3, which illustrates a flow chart of interactive steps of a vehicle control method provided by an embodiment of the present disclosure, applied to a human-machine interface device and a terminal control device in a vehicle, wherein the method includes steps S301-S305.

During actual application, the human-machine interface device is in communication connection to the terminal control device of the vehicle via a transmission system such as a server of Internet of Vehicles, a CAN network, and the like.

S301: when a start instruction for a target function is monitored, the human-machine interface device monitors a gesture operation.

For the above step S301, reference may be made to the detailed description of the step S221, and details are not described herein again.

Step S302: the human-machine interface device generates current gesture data according to the gesture operation.

For the above step S302, reference may be made to the detailed description of the step S222, and details are not described herein again.

Step S303: the human-machine interface device sends the current gesture data to the terminal control device.

For the above step S303, reference may be made to the detailed description of the step S223, and details are not described herein again.

S304: the terminal control device receives the current gesture data sent by the human-machine interface device.

For the above step S304, reference may be made to the detailed description of the step S100, and details are not described herein again.

S305: when the current gesture data meets a preset condition, the terminal control device generates a target control instruction according to the current gesture data, and sends the target control instruction to a target executive mechanism for the target executive mechanism to execute an operation corresponding to the current gesture data.

For the above step S305, reference may be made to the detailed description of the step S200, and details are not described herein again.

Compared with the prior art, the vehicle control method according to the embodiment of the present disclosure has the following advantages:

When performing the gesture operation, the human-machine interface device acquires the gesture operation and generates the gesture data, and then sends the gesture data to the terminal control device of the vehicle, then the terminal control device in the vehicle recognizes and judges the gesture data, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost.

Therefore, the problem that the existing manner of controlling the vehicle using gestures cannot effectively avoid dangers due to incorrect gesture recognition and incorrect data transmission.

Figure 4:
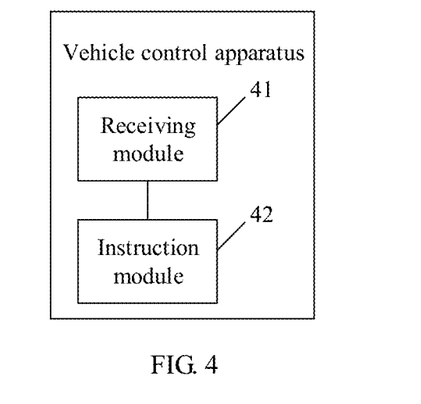
FIG. 4 is a schematic structural diagram of a vehicle control apparatus provided by an embodiment of the present disclosure.

Another object of the present disclosure is to provide a vehicle control apparatus applied to a terminal control device in a vehicle, wherein the terminal control device is in communication connection to a human-machine interface device, and the vehicle includes a plurality of executive mechanisms. Please refer to FIG. 4, which illustrates a schematic structural diagram of a vehicle control apparatus provided by an embodiment of the present disclosure, wherein the apparatus includes:

- a receiving module 41 configured for, when a start instruction for a target function is monitored, receiving current gesture data sent by the human-machine interface device; and
- an instruction module 42 configured for, when the current gesture data meets a preset condition, generating a target control instruction according to the current gesture data, and sending the target control instruction to a target executive mechanism for the target executive mechanism to execute an operation corresponding to the current gesture data.

In the apparatus according to the embodiment of the present disclosure, when the start instruction for the target function is monitored, the receiving module 41 receives the current gesture data sent by the human-machine interface device, then the terminal control device recognizes and judges the gesture data, and only when the gesture data meets the preset condition, the target control instruction may be generated by the instruction module 42 according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

Optionally, the vehicle control apparatus further includes:
- a control module configured for, when receiving wake-up gesture data sent by the human-machine interface device, determining a recommended function according to the wake-up gesture data, and sending recommended information of the recommended function to the human-machine interface device for the human-machine interface device to display; and
- a starting module configured for, when a confirmation operation for the recommended information is monitored, determining that the recommended function is the target function, and generating the start instruction for the target function.

Optionally, in the vehicle control apparatus, a recommended gesture corresponding to each sub-function is stored in the vehicle; and the receiving module 41 includes:

- a sending unit configured for, when the start instruction for the target function is monitored, sending the recommended gesture corresponding to each sub-function in the target function to the human-machine interface device for the human-machine interface device to display; and
- a receiving unit configured for receiving the current gesture data sent by the human-machine interface device.

Further, in the vehicle control apparatus, a recommended gesture corresponding to each sub-function is stored in the vehicle; and the gesture data includes a gesture parameter; and the instruction module 42 includes:
- a reconstructing unit configured for reconstructing an actual gesture according to the gesture parameter;
- an acquisition unit configured for acquiring the recommended gesture corresponding to each sub-function in the target function; and
- a first instruction unit configured for, if a difference value between the actual gesture and the recommended gesture is within a first preset range, generating the target control instruction according to the recommended gesture, and sending the target control instruction to the target executive mechanism.

Optionally, in the vehicle control apparatus, the gesture data further includes a preliminary gesture, and the preliminary gesture is a gesture determined by the human-machine interface device based on the acquired gesture operation; and the acquisition unit is specifically configured for, if a difference value between the preliminary gesture and the actual gesture is within a second preset range, acquiring the recommended gesture corresponding to each sub-function in the target function.

Optionally, in the vehicle control apparatus, a recommended gesture corresponding to each sub-function is stored in the vehicle; and when the recommended gesture corresponding to the target function is a periodic gesture, the instruction module 42 includes:
- a first determining unit configured for determining expected gesture data according to the gesture data acquired last time and the recommended gesture corresponding to the target function; and
- a second instruction unit configured for, if a difference value between the current gesture data and the expected gesture data is within a third preset range, generating the target control instruction according to the recommended gesture, and sending the target control instruction to the target executive mechanism.

Another object of the present disclosure is to provide a vehicle control apparatus applied to a human-machine interface device, wherein the human-machine interface device is in communication connection to a terminal control device in a vehicle, and the vehicle includes a plurality of executive mechanisms. Please refer to FIG. 5, which illustrates a schematic structural diagram of a vehicle control apparatus provided by an embodiment of the present disclosure, wherein the apparatus includes:
- a monitoring module 51 configured for, when a start instruction for a target function is monitored, monitoring a gesture operation;
- a data generating module 52 configured for generating current gesture data according to the gesture operation; and
- a sending module 53 configured for sending the current gesture data to the terminal control device for the terminal control device to generate a target control instruction according to the current gesture data when the current gesture data meets a preset condition, and send the target control instruction to a target executive mechanism for the target executive mechanism to execute an operation corresponding to the current gesture data.

Figure 5:
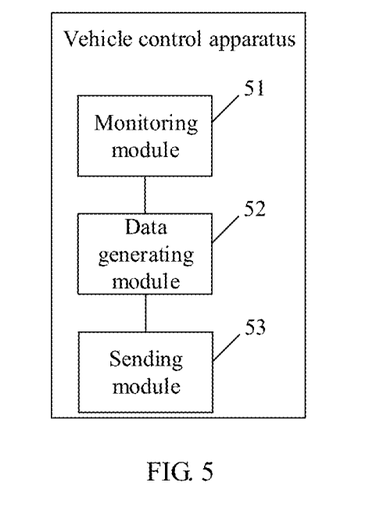
FIG. 5 is a schematic structural diagram of a vehicle control apparatus provided by another embodiment of the present disclosure.

In the apparatus according to the embodiment of the present disclosure, when the start instruction for the target function is monitored, the monitoring module 51 monitors the gesture operation, and the data generating module 52 generates the current gesture data according to the gesture operation, then the sending module 53 sends the current gesture data to the terminal control device, and then the terminal control device recognizes and judges the gesture data, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

Optionally, in the vehicle control apparatus, the data generating module 52 includes:
 a second determining unit configured for determining a gesture parameter according to the gesture operation;
 a third determining unit configured for determining a preliminary gesture according to the gesture parameter; and
 a generation unit configured for generating the current gesture data from the gesture parameter and the preliminary gesture.

Another object of the present disclosure is to further provide a vehicle control system including a human-machine interface device and a terminal control device of a vehicle, wherein:
 when a start instruction for a target function is monitored, the human-machine interface device monitors a gesture operation;
 the human-machine interface device generates current gesture data according to the gesture operation;
 the human-machine interface device sends the current gesture data to the terminal control device;
 the terminal control device receives the current gesture data sent by the human-machine interface device; and
 when the current gesture data meets a preset condition, the terminal control device generates a target control instruction according to the current gesture data, and sends the target control instruction to a target executive mechanism for the target executive mechanism to execute an operation corresponding to the current gesture data.

Yet another object of the present disclosure is to provide a vehicle including the vehicle control system as described above.

The vehicle control system has the same advantages as that of the above vehicle control method and apparatus relative to the prior art, which will not be elaborated herein.

In conclusion, according to the vehicle control method, apparatus, system and vehicle provided by the present disclosure, when performing the gesture operation, the gesture data corresponding to the gesture operation is sent to the terminal control device of the vehicle first, then the terminal control device in the vehicle recognizes and judges the gesture data, and only when the gesture data meets the preset condition, the target control instruction may be generated according to the gesture data, and then the target executive mechanism is controlled to execute the corresponding operation, so that when the gesture data is damaged in the process of being transmitted from the human-machine interface device to the terminal control device, dangers caused by false triggering of the vehicle function due to the error of the gesture data can be avoided, and the safety of controlling the vehicle by gestures can be ensured. Meanwhile, it is not necessary to add additional protective measures on a path of transferring between the human-machine interface device and the terminal control device. The existing modules and technologies can be completely borrowed, and it is only necessary to develop corresponding modules for the terminal control device, which greatly reduces the development difficulty of the whole system and also saves the cost. Therefore, the problem that the existing manner of controlling the vehicle using gestures cannot effectively avoid dangers due to incorrect gesture recognition and incorrect data transmission.

It can be clearly understood by those skilled in the art that, for the sake of convenience and brevity, a detailed working process of the foregoing system, apparatus, and unit may refer to a corresponding process in the foregoing method embodiments, and will not be elaborated herein.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all modules therein may be selected according to actual needs to realize the objective of achieving the technical solution of the embodiment. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing-processing device according to the embodiments of the present disclosure may be implemented by using a microprocessor or a digital signal processor (DSP) in practice. The present disclosure may also be implemented as device or apparatus programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 6:
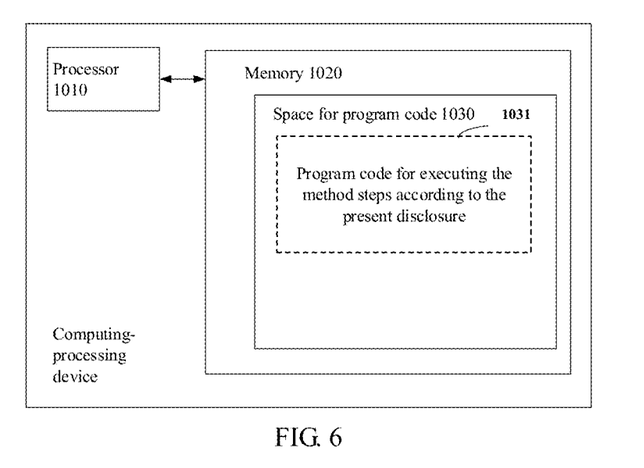
FIG. 6 schematically shows a block diagram of a computing-processing device for executing the method according to the present disclosure.
Figure 7:
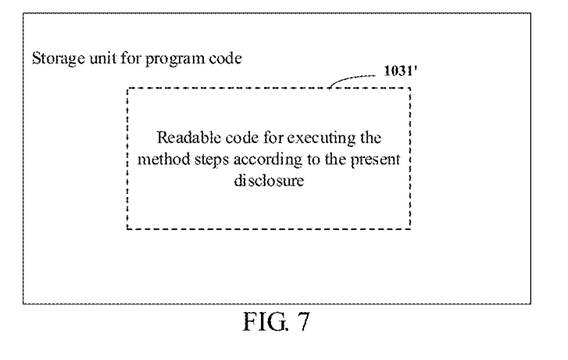
FIG. 7 schematically shows a storage unit for holding or carrying a program code for implementing the method according to the present disclosure.

For example, FIG. 6 shows a computing-processing device that can implement the method according to the present disclosure. The computing-processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has a storage space 1030 of a program code 1031 for implementing any steps of the above method. For example, the storage space 1030 for program code may contain program codes 1031 for individually implementing each of the steps of the above method. Those program codes may be read from one or more computer program products or be written into the one or more computer program products. These computer program products include program code carriers such as hard disks, compact disks (CD), memory cards, or floppy disks. Such computer program products are usually portable or fixed storage units as shown in FIG. 7. The storage unit may have storage segments or storage spaces with similar arrangement to the memory 1020 of the computing-processing device in FIG. 6. The program codes may for example be compressed in a suitable form. Generally, the storage unit contains a computer-readable code 1031', which can be read by a processor like 1010. When those codes are executed by the computing-processing device, the codes cause the computing-processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

Many details are discussed in the specification provided herein. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those apparatuses may be embodied by the same item of hardware. The words first, second, third and so on do not denote any order. Those words may be interpreted as names.

Those described above are merely preferred embodiments of the present disclosure, but are not intended to limit the present disclosure. Any modifications and equivalent substitutions and improvements made without departing from the principle of the present disclosure shall all fall within the protection scope of the present disclosure.

The foregoing descriptions are merely detailed embodiments of the present disclosure, but the protection scope of the present disclosure is not limited thereto. Any changes or substitutions that can be easily thought of by those familiar with the technical field within the technical scope disclosed in the present disclosure should be covered by the protection scope of the present disclosure. Therefore, the protection scope of the present disclosure should be subjected to the protection scope of the claims.

The invention claimed is:

1. A vehicle control method applied to a terminal control device in a vehicle, wherein the terminal control device is in communication connection to a human-machine interface device, the vehicle comprises a plurality of executive mechanisms, and the method comprises:
   by one or more processors, when a start instruction for a target function is monitored, receiving current gesture data sent by the human-machine interface device; and
   by one or more processors, when the current gesture data meets a preset condition, generating a target control instruction according to the current gesture data, and sending the target control instruction to a target executive mechanism for the target executive mechanism to execute an operation corresponding to the current gesture data;
   wherein a recommended gesture corresponding to each sub-function is stored in the vehicle; and when the recommended gesture corresponding to each sub-function in the target function is a periodic gesture, wherein the periodic gesture indicates that a driver needs to periodically execute a gesture operation to control the vehicle to continuously execute the target function, the step of, when the current gesture data meets the preset condition, generating the target control instruction according to the current gesture data, and sending the target control instruction to the target executive mechanism, comprises:
      determining expected gesture data according to the gesture data acquired last time and the recommended gesture corresponding to each sub-function in the target function; and
      if a difference value between the current gesture data and the expected gesture data is within a third preset range, generating the target control instruction according to the current gesture data, and sending the target control instruction to the target executive mechanism.

2. The vehicle control method according to claim 1, wherein the step of, when the start instruction for the target function is monitored, receiving the current gesture data sent by the human-machine interface device, comprises:
   when the start instruction for the target function is monitored, sending the recommended gesture corresponding to each sub-function in the target function to the human-machine interface device for the human-machine interface device to display; and
   receiving the current gesture data sent by the human-machine interface device.

3. The vehicle control method according to claim 1, wherein the current gesture data comprises a gesture parameter; and
   the step of, when the current gesture data meets the preset condition, generating the target control instruction according to the current gesture data, and sending the target control instruction to the target executive mechanism, comprises:
      reconstructing an actual gesture according to the current gesture data;
      acquiring the recommended gesture corresponding to each sub-function in the target function; and
      if a difference value between the actual gesture and the recommended gesture is within a first preset range, generating the target control instruction according to the recommended gesture, and sending the target control instruction to the target executive mechanism.

4. The vehicle control method according to claim 3, wherein the current gesture data further comprises a preliminary gesture, and the preliminary gesture is a gesture determined by the human-machine interface device based on the acquired gesture operation; and the step of, acquiring the recommended gesture corresponding to each sub-function in the target function, comprises:
if a difference value between the preliminary gesture and the actual gesture is within a second preset range, acquiring the recommended gesture corresponding to each sub-function in the target function.

5. The vehicle control method according to claim 1, wherein before the step of, when the start instruction for the target function is monitored, receiving the current gesture data sent by the human-machine interface device, the method further comprises:

when receiving wake-up gesture data sent by the human-machine interface device, determining a recommended function according to the wake-up gesture data, and sending recommended information of the recommended function to the human-machine interface device for the human-machine interface device to display; and when a confirmation operation for the recommended information is monitored, determining that the recommended function is the target function, and generating the start instruction for the target function.

6. The vehicle control method according to claim 5, wherein a start gesture corresponding to each function is stored in the vehicle, and the recommended information comprises a target start gesture for the recommended function; and the step of, when the confirmation operation for the recommended information is monitored, determining that the recommended function is the target function, and generating the start instruction for the target function, comprises:

when monitoring that a difference value between the actual gesture operation for the recommended information and the target start gesture is within a fourth preset range, determining that the recommended function is the target function, and generating the start instruction for the target function.

7. The vehicle control method according to claim 1, wherein the current gesture data comprises a gesture position, a moving speed, a moving direction or a moving shape, wherein:

the moving shape comprises a curved surface diameter and a curved surface center.

8. A computing-processing device, comprising:
a memory in which a computer-readable code is stored; and
one or more processors, wherein when the computer-readable code is executed by the one or more processors, the computing-processing device executes the vehicle control method according to claim 1.

9. The computing-processing device according to claim 8, wherein before the step of, when the start instruction for the target function is monitored, receiving the current gesture data sent by the human-machine interface device, the method further comprises:

when receiving wake-up gesture data sent by the human-machine interface device, determining a recommended function according to the wake-up gesture data, and sending recommended information of the recommended function to the human-machine interface device for the human-machine interface device to display; and when a confirmation operation for the recommended information is monitored, determining that the recommended function is the target function, and generating the start instruction for the target function.

10. The computing-processing device according to claim 8, wherein the step of, when the start instruction for the target function is monitored, receiving the current gesture data sent by the human-machine interface device, comprises:

when the start instruction for the target function is monitored, sending the recommended gesture corresponding to each sub-function in the target function to the human-machine interface device for the human-machine interface device to display; and receiving the current gesture data sent by the human-machine interface device.

11. The computing-processing device according to claim 8, wherein the current gesture data comprises a gesture parameter; and the step of, when the current gesture data meets the preset condition, generating the target control instruction according to the current gesture data, and sending the target control instruction to the target executive mechanism, comprises:

reconstructing an actual gesture according to the current gesture data;
acquiring the recommended gesture corresponding to each sub-function in the target function; and
if a difference value between the actual gesture and the recommended gesture is within a first preset range, generating the target control instruction according to the recommended gesture, and sending the target control instruction to the target executive mechanism.

12. The computing-processing device according to claim 11, wherein the current gesture data further comprises a preliminary gesture, and the preliminary gesture is a gesture determined by the human-machine interface device based on the acquired gesture operation; and the step of, acquiring the recommended gesture corresponding to each sub-function in the target function, comprises:
if a difference value between the preliminary gesture and the actual gesture is within a second preset range, acquiring the recommended gesture corresponding to each sub-function in the target function.

13. A computer-readable medium, wherein the computer-readable medium stores a computer-readable code, and when the computer-readable code is executed, a vehicle control method according to claim 1 is performed.

14. A vehicle control method applied to a human-machine interface device, wherein the human-machine interface device is in communication connection to a terminal control device in a vehicle, the vehicle comprises a plurality of executive mechanisms, and the method comprises:

by one or more processors, when a start instruction for a target function is monitored, monitoring a gesture operation;
by one or more processors, generating current gesture data according to the gesture operation; and
by one or more processors, sending the current gesture data to the terminal control device for the terminal control device to generate a target control instruction according to the current gesture data when the current gesture data meets a preset condition, and send the target control instruction to a target executive mechanism for the target executive mechanism to execute an operation corresponding to the current gesture data;

wherein a recommended gesture corresponding to each sub-function is stored in the vehicle; and when the recommended gesture corresponding to each sub-function in the target function is a periodic gesture, wherein the periodic gesture indicates that a driver needs to periodically execute a gesture operation to control the vehicle to continuously execute the target function, the step of, generating, by the terminal control device, a target control instruction according to the current gesture data when the current gesture data meets a preset condition, and sending, by the terminal control device, the target control instruction to a target executive mechanism for the target executive mechanism, comprises:

determining expected gesture data according to the gesture data acquired last time and the recommended gesture corresponding to each sub-function in the target function; and if a difference value between the current gesture data and the expected gesture data is within a third preset range, generating the target control instruction according to the current gesture data, and sending the target control instruction to the target executive mechanism.

15. The vehicle control method according to claim 14, wherein the step of, generating the current gesture data according to the gesture operation, comprises:

determining a gesture parameter according to the gesture operation;

determining a preliminary gesture according to the gesture parameter; and generating the current gesture data from the gesture parameter and the preliminary gesture.

16. A computing-processing device, comprising:

a memory in which a computer-readable code is stored; and one or more processors, wherein when the computer-readable code is executed by the one or more processors, the computing-processing device executes the method according to claim 14.

17. The computing-processing device according to claim 16, wherein the step of, generating the current gesture data according to the gesture operation, comprises:

determining a gesture parameter according to the gesture operation;

determining a preliminary gesture according to the gesture parameter; and generating the current gesture data from the gesture parameter and the preliminary gesture.

18. A vehicle control system comprising a human-machine interface device and a terminal control device of a vehicle, wherein:

when a start instruction for a target function is monitored, the human-machine interface device monitors a gesture operation;

the human-machine interface device generates current gesture data according to the gesture operation;

the human-machine interface device sends the current gesture data to the terminal control device;

the terminal control device receives the current gesture data sent by the human-machine interface device; and when the current gesture data meets a preset condition, the terminal control device generates a target control instruction according to the current gesture data, and sends the target control instruction to a target executive mechanism for the target executive mechanism to execute an operation corresponding to the current gesture data;

wherein a recommended gesture corresponding to each sub-function is stored in the vehicle; and when the recommended gesture corresponding to each sub-function in the target function is a periodic gesture, wherein the periodic gesture indicates that a driver needs to periodically execute a gesture operation to control the vehicle to continuously execute the target function, the step of, generating, by the terminal control device, a target control instruction according to the current gesture data when the current gesture data meets a preset condition, and sending, by the terminal control device, the target control instruction to a target executive mechanism for the target executive mechanism, comprises:

determining expected gesture data according to the gesture data acquired last time and the recommended gesture corresponding to each sub-function in the target function; and if a difference value between the current gesture data and the expected gesture data is within a third preset range, generating the target control instruction according to the current gesture data, and sending the target control instruction to the target executive mechanism.

* * * * *